United States Patent [19]

Potemkin

[11] Patent Number: 4,770,571
[45] Date of Patent: Sep. 13, 1988

[54] DRILL

[76] Inventor: Gennady Y. Potemkin, Orekhovy proezd, 19, kv. 19, Moscow, U.S.S.R.

[21] Appl. No.: 939,071

[22] PCT Filed: Mar. 13, 1985

[86] PCT No.: PCT/SU85/00020
§ 371 Date: Oct. 27, 1986
§ 102(e) Date: Oct. 27, 1986

[87] PCT Pub. No.: WO86/05426
PCT Pub. Date: Sep. 25, 1986

[51] Int. Cl.⁴ ............................................. B23R 51/00
[52] U.S. Cl. .................................. 408/188; 408/197; 408/713

[58] Field of Search .............. 408/197, 210, 211, 212, 408/213, 219, 220, 221, 222, 223, 224, 227, 228, 229, 188, 713; 407/33, 35, 36, 37, 38, 39, 40, 42, 43, 48, 54, 62, 103, 113, 114, 115

[56] References Cited

U.S. PATENT DOCUMENTS 3,688,367  9/1972  Bennett ........................... 407/54 X
4,251,172  2/1981  Durand ........................... 407/62 X
4,525,110  6/1985  Stosanovski .................... 407/42 X Primary Examiner—Z. R. Bilinsky
Attorney, Agent, or Firm—Burgess, Ryan & Wayne

[57] ABSTRACT

A drill comprises a holder (1) and a cutting member in the form of a pair of discs (2,3). Each disc (2,3) has at least five facets (11,12) arranged along its periphery and symmetrically with respect to its center line (13, 14), the discs (2, 3) being mounted in such a manner that angles (φ) of inclination of their facets (11, 12) with respect to an axis (4) of the holder (1) are equal to one another.

5 Claims, 2 Drawing Sheets

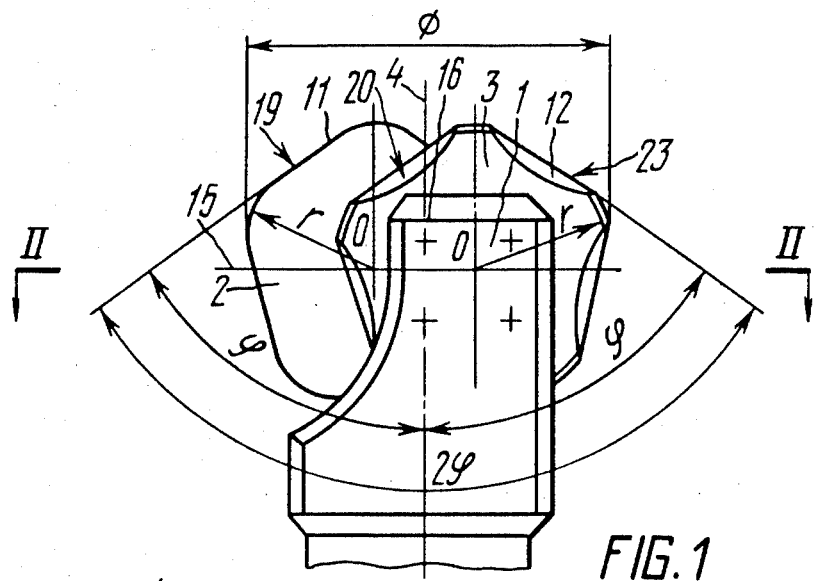
FIG. 1
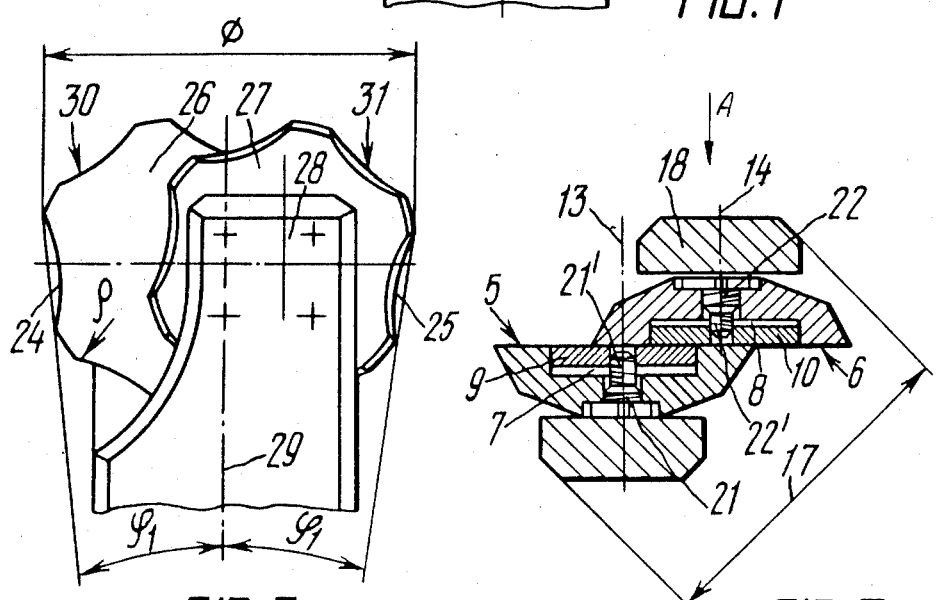
FIG. 3
FIG. 2

DRILL

TECHNICAL FIELD

The invention relates to the metal machining, and in particular, it deals with drills.

BACKGROUND ART

Known in the art is a drill disclosed in USSR Inventor's Certificate No. 718232 issued July 28, 1978 and published 1980, comprising a holder and a cutting member in the form of a pair of discs mounted in the holder eccentrically with respect to the axis thereof, the discs partly engaging each other with their end faces which have recesses to receive an insert for setting a desired diameter of drilling. This drill may be successfully used for counterboring. Since the cutting member of the drill comprises two round discs secured to each other, it cannot be used for drilling in a continuous body of material as the cutting edge of one disc at the center of the head portion of the drill is situated in the immediate proximity to the clearance face of the other disc. In drilling a hole in a continuous body of material, the root of chip (in the area where the chip has a high enough rigidity) bears against the clearance face of the cutting disc and the chip would get in between the engaging end faces of the cutting discs. The chip getting in between the discs hampers the cutting process, and causes a temperature increase in the cutting zone so that the drill life is reduced. In addition, the diametrical size of the drill is at rather a large distance from the head end face of the holder and is equal to about ⅔ R wherein R is the radius of the cutting disc. Therefore the diagonal of holder cross-section cannot exceed the diameter of the hole being machined in a plane drawn at a distance of ⅔ R from the center line of the cutting discs, i.e. the distance from the head end face of the holder to the center line of the cutting discs should be kept minimum possible so that the holder might have maximum possible cross-sectional area. A small cross-sectional area of the holder cannot ensure necessary rigidity of the drill.

It should also be noted that in machining holes in a continuous body of material only about one fourth of the whole circular cutting edge of each disc can take part directly in the cutting process (with one setting of the cutting member) so that the drill life is reduced as compared to penta- and hexahedral discs.

DISCLOSURE OF THE INVENTION

The present invention seeks to provide a drill with discs of a cutting member designed and arranged so as to increase the distance from a cutting edge of one disc to a clearance face of the other disc and to obtain the length of a diagonal of the holder cross-section to be close to the drill diameter and thus to improve the rigidity of the drill.

This is accomplished in a drill, comprising a holder and a cutting member in the form of a pair of discs mounted in the holder eccentrically with respect to the axis thereof and partly engaging each other with their end faces which have recesses for accommodation of an insert for setting a desired diameter of the drill, wherein, according to the invention, each disc of the cutting member has at least five facets disposed along the periphery thereof symmetrically with respect to the center line of the disc, the discs being mounted in such a manner that the angles of inclination of their facets with respect to the axis of the holder are equal to one another.

It is known that each facet of the disc is the clearance face of the drill and its intersection with the end face of the disc defines the cutting edge. Therefore, owing to the fact that the cutting discs are made with facets, at least with five facets, the distance from the cutting edge of one disc to the clearance face of the other disc is increased. Consequently the root of chip substantially cannot directly engage the clearance face of the cutting disc. Moreover, the chip can leave the cutting edge in the central part of the cutting member more easily since the direction of movement of chip is almost parallel with the clearance face of the disc. The cutting edge consisting of individual conjugated portions also contributes to enhanced chip breaking.

Furthermore, the diametrical size of the drill in this case is disposed in the area of the head end face of the holder so that the length of the diagonal of the holder cross-section can be close to the drill diameter, i.e. this diagonal is greater as compared to that of a drill having round cutting discs.

Thus the rigidity, hence strength of the holder is considerably improved.

Each disc is preferably made with an axial hole receiving a screw having a threaded portion thereof screwed in the insert, the screw providing for setting the disc in a desired angular position with respect to the holder axis. The provision of the facets on the cutting discs makes it necessary to retain the discs in pre-set angular positions so as to ensure a desired rake angle. This angle is defined by two facets each inclined with respect to the axis of symmetry of the cutting member. The rake angle is set by means of a screw mounted in the axial hole of the disc, and a desired value of the angle can be continuously varied and reliably retained by pressing the cutting discs against the insert.

The facets may be conjugated with one another with a radius ensuring a smooth transition from one facet to the other. The provision of the radius conjugation increases the length of the cutting edge thus improving quality of machining and lowering the intensity of load applied to the portions of the cutting edges which are disposed in the zone of maximum drilling diameter.

For drilling holes in non-malleable materials such as cast iron and bronze, the facets of each disc are preferably made straight.

The facets of each disc may be made curved so as to improve reliability of centering of the tool during drilling and further enhance chip breaking.

BRIEF DESCRIPTION OF THE DRAWINGS

The invention will now be described with reference to specific embodiments thereof illustrated in the accompanying drawings, in which:

FIG. 1 shows a drill according to the invention having a cutting member and a holder, which is shown only partly, in a side elevation view;

FIG. 2 is a view taken along line II—II in FIG. 1;

FIG. 3 shows a drill according to the invention in which facets of the cutting member are curved and consist of concave and convex radius portions, in a side elevation view;

BEST MODE OF CARRYING OUT THE INVENTION

Figure 4:
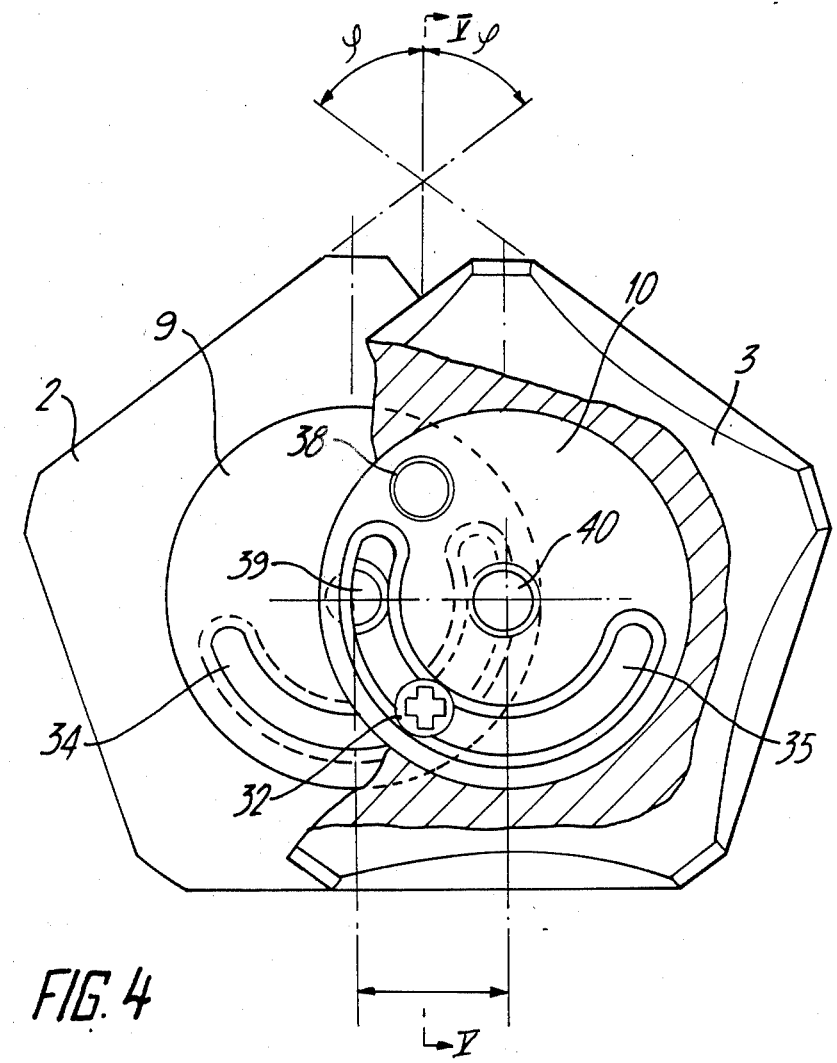
FIG. 4 illustrates a cutting member of the drill assembly shown in FIG. 1 viewed along arrow A in FIG. 2.

A drill according to the invention shown in FIGS. 1 and 2 has holder 1 and a composite adjustable cutting member. A cutting member shown in FIG. 1 consists of a pair of discs 2 and 3 which are secured in a slot of the holder and mounted eccentrically with respect to its axis 4. The discs 2 and 3 have their end faces 5 (FIG. 2) and 6 partly engaging each other. Recesses 7 and 8 are made in the end faces 5 and 6 of the discs 2 and 3 respectively to accommodate a composite insert consisting of an insert member 9 received in the recess 7 and an insert member 10 received in the recess 8 which are secured to each other, e.g. by means of a pin and screw (not shown in the drawings). The insert 9, 10 sets a desired diametrical size of the drill. As shown in FIG. 1, five inclined facets 11, 12, respectively, are provided on the periphery of each disc 2 and 3 symmetrically with respect to center lines 13 (FIG. 2) and 14, respectively.

Figure 5:
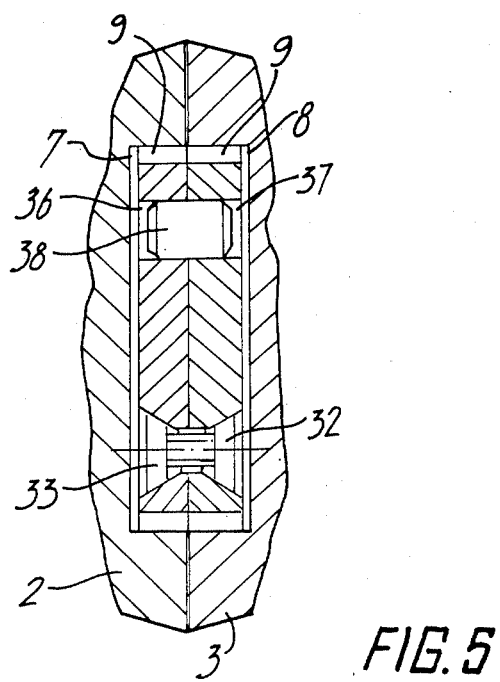
FIG. 5 is a cross-sectional view of the cutting member of FIG. 4, viewed along line V—V thereof.

The required operational size of a composite adjustable cutting member according to the present invention is fixed and secured by means of an expandable insert member which is placed into recesses 7 and 8 of the cutting discs 2 and 3 of FIGS. 4 and 5. This arrangement is found specifically in the aforementioned U.S.S.R. Inventors' Certificate No. 718,232, published in 1980. The composite insert is formed of insert members 9 and 10, secured by a screw 32 which engages with a nut 33. The screw 32 and nut 33 are positioned in curvilinear angular profiled slots 34 and 35 of insert members 9 and 10, respectively. Insert members 9 and 10 take the form of cylindrical discs, each of which has an eccentrically ranges holes 36 and 37. The holes accommodate a pin 38 and by pivoting insert members 9 and 10 about pin 38, one is able to continuously and smoothly change the interaxial distance h between insert members 9 and 10. When the required interaxial distance is set by means of the screw 32 and nut 33, the insert members 9 and 10 are then fixed in recesses 7 and 8 of the cutting disc by means of screws 21 and 22.

The discs 2 and 3 are mounted in the holder 1 in such a manner that angles $\phi$ of inclination of their facets 11 and 12 with respect to the axis 4 of the holder 1 are equal to one another. The facets 11 of the disc 2, as well as the facets 12 of the discs 3 are straight and conjugated with a radius r. The diametrical size of the drill will move ahead of a line 15 drawn through the center lines 13 and 14 of the cutting discs 2 and 3 during operation owing to the provision of the facets 11 and 12 on the discs 2 and 3.

Moreover, the diameter can be aligned with the maximum cross-sectional area of a head portion 16 of the holder 1. Therefore, a diagonal 17 (FIG. 2) of the cross-sectional of a rectangular portion 18 of the holder 1 can be of a size close to the diametrical size $\phi$ of the drill.

In addition, the provision of the facets 11 and 12 on the cutting discs 2 and 3 results in a space defined between a cutting edge 19 (FIG. 1) of the disc 2 and a clearance face 20 of the disc 3, whereby the removal of chip from the cutting zone is greatly facilitated, and it is the more so that the direction of the chip leaving the cutting edge substantially coincides with the plane of the clearance face 20 of the disc 3. The discs 2 and 3 have axial holes to receive screws 21 (FIG. 2) and 22. Threaded portions 21' and 22' of the screws 21 and 22 are screwed in the insert members 9 and 10 of the composite adjustable insert. The screws 21 and 22 ensure the stationary position of the cutting discs 2 and 3 to retain them in a pre-set angular position at which the cutting edges 19 and 23 of the discs 2 and 3 define an angle $2\phi$ which is the angle of inclination of the facets of the drill, that is, the angle which is formed by the main cutting edges with respect to the work surface, provided $\phi = \phi$.

FIG. 3 shows an embodiment of the drill in which facets 24 and 25 of discs 26 and 27 are curved and conjugated with a radius $\rho$, and the facets may be both concave and convex.

The discs 26 and 27 are hexahedral and are mounted in the slot of a holder 28 eccentrically with respect to its axis 29, the angles $\phi_1$ of inclination of their facets 24 and 25 with respect to the axis 29 of the holder 28 being equal to one another.

Holes are machined with the drill according to the invention in the known manner using appropriate metal cutting machine tools. In drilling holes in metals and alloys with the drill according to the invention featuring adjustable drilling diameter and having the pentahedral 2 and 3 or hexahedral 26 and 27 discs, only one cutting edge 19 and 23 or 30 and 31 out of five or six cutting edges is subjected to a normal design wear. When these cutting edges become blunt, the discs 2 and 3 are turned about their center lines 13 and 14 through 72° and the discs 26 and 27 are turned about their unreferenced centerlines through 60° and are locked in the new position. As a result, other sharp ground cutting edges will come into play.

The combination of such factors as the possibility of selectively retaining the cutting discs in a plurality of positions concurrently with the feature ensuring an optimum distance from the cutting edge of one disc to the clearance face of the other disc provides for a long life and improved durability of the adjustable cutting member. The possibility of a continuous variation of the rake angle of the drill enlarges the field of its application since holes may be drilled in various materials without regrinding the cutting edges. In addition, the drill according to the invention may also be used as an adjustable counterborer or corner cutter.

Conjugation of the facets with a radius makes it possible to improve quality of surface finish of holes in drilling and boring.

INDUSTRIAL APPLICABILITY

The invention may be most advantageously used to replace known twist and flat drills of a diameter larger than 40 mm for counterboring and drilling holes in a continuous body of material (such as metals and metal alloys).

In addition, the invention may be used for machining short internal conical surfaces, boring cylindrical surfaces and also for milling various surfaces.

I claim:
1. A drill comprising:
   a holder having an axis;
   a cutting member including first and second discs, each disc having an end face, each end face having a recess for receiving an insert which sets a desired diameter of the drill;
   means for mounting the first and second discs in the holder eccentrically with respect to the axis of the holder so that the end faces partly engage each other;
   the improvement being that:
   each disc has a periphery and is formed with at least five facets which are arranged along its periphery and which are symmetrical with respect to a center line of the disc; and the facets of each disc having angles of inclination with respect to the axis of the holder, that are equal to one another.

2. A drill as claimed in claim 1, characterized in that the facets (11 and 12, 23 and 25) of each disc (2 and 3, 26 and 27), are conjugated with one another with a radius ($\sigma$, $\rho$).

3. A drill as claimed in claims 1 or 2, characterized in that the facets of (11 and 12) of each disc (2 and 3) have a rectilinear form.

4. A drill as claimed in claim 1 or 2, characterized in that the facets (24 and 25) of each disc (26 and 27) have a curvilinear form.

5. A drill according to claim 1, wherein each disc has an axial hole, and a screw having a threaded portion is received in each axial hole and screwed in the insert received in the recess of each disc, each screw ensuring that the respective disc is set at a desired angular position with respect to the axis of the holder.

* * * * *